(12) United States Patent
Li

(10) Patent No.: US 10,902,663 B2
(45) Date of Patent: Jan. 26, 2021

(54) METHOD AND APPARATUS FOR DISPLAYING 2D APPLICATION INTERFACE IN VIRTUAL REALITY DEVICE

(71) Applicant: Beijing Pico Technology Co., Ltd., Beijing (CN)

(72) Inventor: Ligang Li, Beijing (CN)

(73) Assignee: Beijing Pico Technology Co., Ltd., Beijing (CN)

( * ) Notice: Subject to any disclaimer, the term of this patent is extended or adjusted under 35 U.S.C. 154(b) by 675 days.

(21) Appl. No.: 15/115,092

(22) PCT Filed: Feb. 19, 2016

(86) PCT No.: PCT/CN2016/074160
§ 371 (c)(1),
(2) Date: Jul. 28, 2016

(87) PCT Pub. No.: WO2017/113488
PCT Pub. Date: Jul. 6, 2017

(65) Prior Publication Data
US 2018/0018806 A1     Jan. 18, 2018

(30) Foreign Application Priority Data

Dec. 31, 2015 (CN) .......................... 2015 1 1026678

(51) Int. Cl.
*G06F 17/20* (2006.01)
*G06T 15/04* (2011.01)
(Continued)

(52) U.S. Cl.
CPC .............. *G06T 15/04* (2013.01); *G06F 3/011* (2013.01); *G06F 3/04817* (2013.01); *G06T 15/00* (2013.01); *G06T 19/20* (2013.01)

(58) Field of Classification Search
CPC ................................. G06T 15/20; G06T 15/04
See application file for complete search history.

(56) References Cited

U.S. PATENT DOCUMENTS

2012/0038745 A1* 2/2012 Yu ........................... G06T 15/08
                                                         348/46
2016/0188279 A1* 6/2016 Rajamani .............. G06F 3/1454
                                                         345/2.3
(Continued)

FOREIGN PATENT DOCUMENTS

CN      101266546       9/2008
CN      102937968 A     2/2013
(Continued)

OTHER PUBLICATIONS

OpenGL—Frame buffers (https://open.gl/framebuffers) (as appearing on May 17, 2015, and available at https://web.archive.org/web/20150517074715/https://open.gl/framebuffers).*

(Continued)

*Primary Examiner* — Keith D Bloomquist
(74) *Attorney, Agent, or Firm* — Leydig, Voit & Mayer, Ltd.

(57) ABSTRACT

The present method comprises: obtaining a texture of one or more 2D application interfaces to be displayed; determining a virtual reality scene to be displayed, and writing the virtual reality scene into a frame buffer of an Android system in a left-right screen splitting mode using an OpenGL function; sketching contents in the frame buffer of the Android system onto left and right screens of the virtual reality device respectively to form a virtual screen in the virtual reality scene; sketching the obtained texture of the one or more 2D application interfaces to be displayed onto the virtual screen in the virtual reality scene of the left and right screens, respectively. The method renders the 2D application interface as images in left and right eyes simultaneously, with a three-dimensional sense, and facilitates the use of a large number of existing Android applications in the virtual reality system.

10 Claims, 1 Drawing Sheet

(51) Int. Cl.
  *G06T 15/00*    (2011.01)
  *G06F 3/01*     (2006.01)
  *G06F 3/0481*   (2013.01)
  *G06T 19/20*    (2011.01)

(56) References Cited

U.S. PATENT DOCUMENTS

2017/0053443 A1* 2/2017 Diament ................ G06F 3/044
2017/0070729 A1   3/2017 Li et al.

FOREIGN PATENT DOCUMENTS

| CN | 103081002 A | 5/2013 | | |
| CN | 105192982 A | 12/2015 | | |
| GB | 2494434 A | * | 3/2013 | ............. G06T 15/20 |
| WO | WO 2012/031406 A1 | 3/2012 | | |

OTHER PUBLICATIONS

State Intellectual Property Office of the P.R. China, International Search Report in International Application No. PCT/CN2016/074160 (dated Sep. 28, 2016).
"CrossApp" http://www.arvrschool.com/read.php?tid=485&fid=84 (Oct. 16, 2015).
"Graphic Architecture" http://source.android.com/devices/graphics/architecture.html (Nov. 9, 2015).

* cited by examiner

METHOD AND APPARATUS FOR DISPLAYING 2D APPLICATION INTERFACE IN VIRTUAL REALITY DEVICE

CROSS-REFERENCE TO RELATED APPLICATIONS

This application is a national phase entry of International Application No. PCT/CN2016/074160, filed Feb. 19, 2016 and titled "A Method And Apparatus For Displaying 2D Application Interface In Virtual Reality Device," which claims priority to and the benefit of Chinese Patent Application No.: 201511026678.8, filed Dec. 31, 2015 and titled "A Method And Apparatus For Displaying 2D Application Interface In Virtual Reality Device." The contents of the above-identified Applications are relied upon and incorporated herein by reference in their entirety.

FIELD OF THE INVENTION

The invention relates to the field of virtual reality, in particular to a method and apparatus for displaying 2D application interface in virtual reality devices.

BACKGROUND OF THE INVENTION

A virtual reality system is a kind of computer simulation system that can create a virtual world experienced by users. It is a system simulation of interactive 3D dynamic scene and physical activity with multi-source information mixed. The virtual reality system uses a computer to generate an emulated environment and enables users to immerse in the environment. For example, users achieve their interaction with the virtual reality system by wearing virtual reality helmets or other virtual reality devices.

In recent years, because of its advantages of open-source and complete ecological environment, Android system has gradually become the first choice of many virtual reality operating systems. However, the virtual reality device requires to render a left-eye picture and a right-eye picture to produce a dimensional sense. Since the existing Android applications are not developed and designed particularly for the virtual reality device, they typically use 2D application interface and do not meet the demands for virtual reality device. Therefore, huge amounts of Android applications cannot be used in a virtual reality system, which leads to the lack of applications and poor ecological environment of virtual reality systems.

SUMMARY OF THE INVENTION

Pertaining to aforementioned problems, this disclosure provides a method and apparatus for displaying 2D application interface in virtual reality devices that overcomes the aforementioned problems or at least partially addresses the aforementioned problems.

According to one aspect of the disclosure, it provides a method of displaying a 2D application interface in a virtual reality device, including:

obtaining a texture of one or more 2D application interfaces to be displayed;

determining a virtual reality scene to be displayed, and writing the virtual reality scene into a frame buffer of the Android system in a left-right screen splitting mode using an OpenGL function;

sketching contents in the frame buffer of the Android system onto the left and right screens of the virtual reality device respectively to form a virtual screen in the virtual reality scene;

sketching the obtained texture of the one or more 2D application interfaces to be displayed onto the virtual screen in the virtual reality scene of the left and right screens, respectively.

Alternatively, obtaining the texture of the one or more 2D application interfaces to be displayed includes:

applying for the corresponding layers for the one or more 2D application interfaces to be displayed, respectively;

calling a SurfaceFlinger module in the Android system that is responsible for display and synthesis, labelling the synthesis mode as a GLES synthesis mode in the setUp HWComposer( ) function of the SurfaceFlinger module, and synthesizing the layers using the GLES synthesis mode.

Alternatively, synthesizing the layers using the GLES synthesis mode comprises:

determining display relations of the layers;

creating a texture object bound to GL_TEXTURE_2D and a frame buffer object bound to GL_FRAMBUFFER function using the OpenGL function, and correlating the frame buffer object with the texture object; and according to the display relations of the layers, sketching the 2D application interfaces to be displayed in each of the layers into the texture object.

Alternatively, sketching the obtained texture of the one or more 2D application interfaces to be displayed onto the virtual screen in the virtual reality scene of the left and right screens includes:

obtaining the texture of the one or more 2D application interfaces to be displayed from the frame buffer object related to the texture object and sketching the texture of the one or more 2D application interfaces to be displayed onto the virtual reality screen of the left and right screens respectively using the OpenGL function.

Alternatively, determining the virtual reality scene to be displayed includes: obtaining data of a user's head state by a sensor of the virtual reality device, and determining the virtual reality scene to be displayed based on the data of the user's head state.

According to another aspect of the disclosure, an apparatus for displaying 2D application interface in a virtual reality device is provided. The apparatus includes:

a 2D application interface processing unit configured to obtain a texture of one or more 2D application interfaces to be displayed;

a virtual reality scene processing unit configured to determine a virtual reality scene to be displayed, and write the virtual reality scene into a frame buffer of an Android system in a left-right screen splitting mode using an OpenGL function;

a sketching unit configured to sketch contents in the frame buffer of the Andrew system onto left and right screens of the virtual reality device respectively to form a virtual screen in the virtual reality scene, and to sketch the obtained texture of the one or more 2D application interfaces to be displayed onto the virtual screen in the virtual reality scene of the left and right screens, respectively.

Alternatively, the 2D application interface processing unit includes:

a layer applying module configured to apply for the corresponding layers for the one or more 2D application interfaces to be displayed, respectively;

a synthesis module configured to call a SurfaceFlinger module in the Android system that is responsible for display synthesis, to label the synthesis mode as a GLES synthesis mode in the setUp HWComposer( ) function of the SurfaceFlinger module, and to synthesize the layers using the GLES synthesis mode.

Alternatively, the synthesis module is specifically configured to determine display relations of the layers, to create a texture object bound to GL_TEXTURE_2D and a frame buffer object bound to GL_FRAMBUFFER by the OpenGL function, to correlate the frame buffer object with the texture object, and to sketch the 2D application interfaces to be displayed in each of the layers into the texture object according to the display relations of the layers.

Alternatively, the sketching unit is specifically configured to obtain the texture of the one or more 2D application interfaces to be displayed from the frame buffer object correlated to the texture object, and to sketch the texture onto the virtual screen in the virtual reality scene of the left and right screens respectively using the OpenGL function.

Alternatively, the virtual reality scene processing unit is specifically configured to obtain data of a user's head state by a sensor of the virtual reality device, and to determine the virtual reality scene to be displayed based on the data of the user's head state.

Based on the discussion above, the technical scheme of this disclosure utilizes the following technical approaches to address the problem that the existing 2D application interface cannot be rendered in the virtual reality device of the virtual reality system: first, a texture of one or more 2D application interfaces to be displayed is obtained; and a virtual reality scene to be displayed is then determined; the determined virtual reality scene to be displayed is written into a frame buffer of the Android system in the left-right screen splitting mode using the OpenGL function; and the technique used in the Android system about reading contents of the frame buffer of the Android system for sketching is leveraged to display the virtual reality scene onto left and right screens of the virtual reality device, thus forming a virtual screen in the virtual reality scene; finally, the texture of the one or more 2D application interfaces to be displayed is sketched onto the virtual screen in the virtual reality scene of the left and right screens, respectively, so as to render the 2D application interface as images in left and right eyes simultaneously, with a three-dimensional sense. The method facilitates the use of a large number of existing Android applications in the virtual reality system, and thus is at low cost, simple and has improved the ecological environment of the virtual reality system and fits to practical use.

The above description only presents the outline of technical solution of this disclosure. In order to make the technical methods of this disclosure be understood more clearly, to enable the implementation of the methods in accordance with the specification, and to make the aforementioned and other purposes, features, and advantages of this disclosure more understandable, the following embodiments of the present disclosure are presented.

BRIEF DESCRIPTION OF THE DRAWINGS

By reading the following detailed description of the preferred embodiments below, a variety of other advantages and benefits of this disclosure will become clear to one of ordinary skill in the related art. Appended drawings are used only for illustrating the purpose of the preferred embodiments and are not considered as limitations of this disclosure. Moreover, throughout the drawings, the same reference symbols represent the same parts of the system. The brief description of the appended drawings is illustrated below.

DETAILED DESCRIPTION OF THE PREFERRED EMBODIMENTS

The exemplary embodiments of the invention will be described in more detail according to the appended drawings. Although the drawings show the exemplary embodiments of this disclosure, it should be understood that this disclosure may be implemented in various ways and should not be limited to the embodiments stated here. On the contrary, presenting these embodiments is to facilitate more thoroughly understanding of this disclosure, and to completely convey the scope of this disclosure to one of ordinary skill in the related art.

Figure 1:
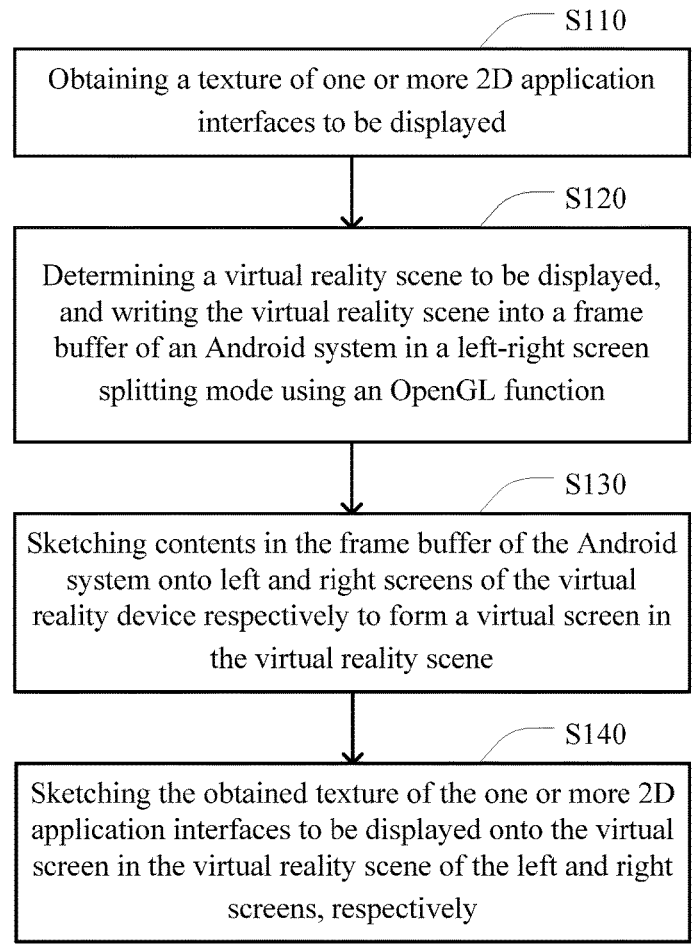
FIG. 1 is a flow chart of a method for displaying the 2D application interface in the virtual reality device according to one embodiment of this disclosure.

Referring to FIG. 1, illustrated is a flow chart of the method of displaying the 2D application interface in the virtual reality device according to one embodiment of the disclosure. As shown in FIG. 1, the method includes:

Step S110, obtaining a texture of one or more 2D application interfaces to be displayed.

In the Android system, the texture is the specific contents of the application interfaces that is loaded into the graphics memory and needs to be shown on the screen of the display device, such as a picture in the pvr format. In a more complex case, for example, a user will run an application A, and while the application A is started an appended advertisement application B will be run, in which the application B is displayed only in the central area of the screen. At this time, a plurality of 2D application interfaces to be displayed are synthesized to acquire a synthesized texture.

Step S120, determining a virtual reality scene to be displayed, and writing the virtual reality scene into a frame buffer of the Android system using the OpenGL functioning the left-right screen splitting mode using an OpenGL function.

Step S130, sketching the contents in the frame buffer of the Android system onto left and right screens of the virtual reality device respectively to form a virtual screen in the virtual reality scene.

In the Android system, writing data in a specific format into the Framebuffer of the Android system means outputting the displayed contents to the screen. Therefore, the data written in the Framebuffer at step S120 is not processed between step S120 and step S130, but only displayed on the left and right screens in the virtual reality device to form the virtual screen in the virtual reality scene. In particular, a grid can be established for the left and right screens of the virtual reality system. Therefore, when writing the virtual reality scene into the frame buffer of the Android system in the left-right screen splitting mode using the OpenGL function at step S120, related information about the grid for sketching the virtual reality scene is included in order to sketch the virtual reality scene to the grid of the left screen and right screens respectively and to display the result.

Step S140, sketching the obtained texture of the one or more 2D application interfaces to be displayed onto the virtual screen in the virtual reality scene of the left and right screens, respectively.

For example, if the virtual reality scene is a living room, the virtual screen of the virtual reality scene may be a rear projection TV in the living room; and if the virtual reality scene is a cinema, the virtual screen of the virtual reality scene may be the movie screen in the cinema and so on.

It can be seen that, in order to address the existing problem that the 2D application interface cannot be rendered on the virtual reality device of the virtual reality system, the method shown in FIG. 1 utilizes the following techniques: first, a texture of one or more 2D application interfaces to be displayed is acquired; and a virtual reality scene to be displayed is then determined; the determined virtual reality scene to be displayed is written into a frame buffer of the Android system in the left-right screen splitting mode by using a OpenGL function; the technique used in the Android system about reading contents of the frame buffer of the Android system for sketching is leveraged to display the virtual reality scene onto left and right screens of the virtual reality device, thus forming a virtual screen in the virtual reality scene; finally, the texture of the one or more 2D application interfaces to be displayed is sketched onto the virtual screen in the virtual reality scene of the left and right screens, respectively, so as to render the 2D application interface as images in left and right eyes simultaneously, with a three-dimensional sense. The method facilitates the use of a large number of existing Android applications in the virtual reality system, and thus is at low cost, simple and has improved the ecological environment of the virtual reality system and fits for practical use.

In one embodiment of this disclosure, at step S110 of the method shown in FIG. 1, obtaining a texture of one or more 2D application interfaces to be displayed includes: applying for the corresponding layers for the one or more 2D application interfaces to be displayed, respectively; calling a SurfaceFlinger module in the Android system that is responsible for display and synthesis, labelling the synthesis mode as a GLES synthesis mode in the setUp HWComposer( ) function of the SurfaceFlinger module and synthesizing the layers using the GLES synthesis mode.

As mentioned above, in the Android system, when multiple 2D application interfaces are to be displayed on the screen of the display device, the interfaces to be displayed are synthesized. Before calling the SurfaceFlinger module for synthesizing the 2D application interfaces in software mode, a Client category shall be created, and a layer is then applied for from the SurfaceFlinger module. In the Android system, synthesizing the 2D application interfaces may be implemented by calling and Overlay by hardware, or calling the SurfaceFlinger by software, wherein the manner of hardware is simple but not suitable to implement the technical solution of this disclosure. Therefore, the method of calling the SurfaceFlinger is proposed in this embodiment. Likewise, in the process of calling SurfaceFlingere, the following procedures are performed: calling the preComposition( ) function to start the synthesis; calling the rebuildLayerStacks function to reconstruct a layer stack to be synthesized; and calling the setUp HWComposer( ) function to set a synthesis mode. In the existing techniques, taking into account the synthesis efficiency, SurfaceFlinger often utilizes the HWC synthetic mode to synthesize the layers, which is also not suitable for the technical solution of the embodiment. Therefore, in this embodiment, the synthesis mode is labelled as the GLES synthesis mode.

After the above procedures, SurfaceFlinger further calls the doDebugFlashRegions( ) function for debugging, and then performs the synthesis which is the most important stage. SurfaceFlinger can call the deComposition( ) function for synthesis. During the execution of this function, the dodisplay Composition ( ) function can be called to accomplish the synthesis for each display device so as to achieve displaying on multiple display devices such as a tablet computer and a smart phone. In the execution of the dodisplayComposition( ) function, the doComposeSurfaces ( ) function can also be called to sketch the contents of each of the layers to the Framebuffer of the Android system. However, in the technical scheme of the disclosure, since the virtual reality scene is to be written into the Framebuffer of the Android system, the one or more 2D application interfaces to be displayed cannot be processed in the above-described way.

Therefore, specifically, in the above method according to one embodiment of the disclosure, synthesizing the layers using the GLES synthesis mode includes: determining the display relations of the layers; creating a texture object bound to GL_TEXTURE_2D and a frame buffer object bound to GL_FRAMBUFFER using the OpenGL function, and correlating the frame buffer object with the texture object; and according to the display relationship of the layers, sketching the 2D application interfaces to be displayed in each of the layers into the texture object.

Below are exemplary codes of one specific embodiment for creating a texture object bound to GL_TEXTURE_2D and a frame buffer object bound to GL_FRAMBUFFER, and correlating the frame buffer object with the texture object:

//Generate a texture object and bind the object to GL_TEXTURE_2D and then initialize glGenTextures (1, &mScreenTexture);
glBindTexture(GL_TEXTURE_2D, mScreenTexture);
glTexParameteri(GL_TEXTURE_2D, GL_TEXTURE_WRAP_S, GL_CLAMP_TO_EDGE);
glTexParameteri(GL_TEXTURE_2D, GL_TEXTURE_WRAP_T, GL_CLAMP_TO_EDGE);
glTexParameteri(GL_TEXTURE_2D, GL_TEXTURE_MAG_FILTER, GL_LINEAR);
glTexParameteri(GL_TEXTURE_2D, GL_TEXTURE_MIN_FILTER, GL_LINEAR);
glTexImage2D(GL_TEXTURE_2D, 0, GL_RGBA, width, height, 0, GL_RGBA, GL_UNSIGNED_BYTE, 0);
//Generate a Framebuffer object and bind the object to GL_FRAMEBUFFER
glGenFramebuffers(1, &m Framebuffer);
glBindFramebuffer(GL_FRAMEBUFFER, mFramebuffer);
//Correlate Texture with Framebuffer.
glFramebufferTexture2D(GL_FRAMEBUFFER, GL_COLOR_ATTACHMENT0, GL_TEXTURE_2D, mScreenTexture, 0);

This way allows the synthesis results of the ComposeSurfaces ( ) function to be sketched to the created texture object, thereby converting the 2D application interfaces into a texture object.

Those skilled in the art should understand that the example of synthesizing the layers in the GLES synthesis mode provided in this embodiment does not pose restrictions to other embodiments. The advantage of the embodiment is that it sketches the 2D application interfaces to be displayed in each of the layers into the new texture object according to the display relations without using the Frambuffer of the Android system.

The texture object is bound to another new frame buffer object, Frambuffer. Therefore, specifically, in one embodiment of the present disclosure, sketching the obtained texture of the one or more 2D application interfaces to be displayed onto the virtual screen in the virtual reality scene of the left and right screens respectively includes: obtaining the texture of the one or more 2D application interfaces to be displayed from the frame buffer object correlated to the texture object, and sketching the texture onto the virtual screen in the virtual reality scene of the left and right screens respectively using the OpenGL function. In the above embodiment, the OpenGL ES function may be specifically used to complete the steps of sketching the texture onto the virtual screen, creating a texture object bound to the GL_TEXTURE_2D and a frame buffer object bound to the GL_FRAMBUFFER and correlating the frame buffer object with the texture object.

In one embodiment of the disclosure, in the method described above, determining the virtual reality scene to be displayed includes: obtaining the data of the user's head state by a sensor of the virtual reality device, and determining the virtual reality scene to be displayed according to the data of the user's head state.

For example, obtaining the data of users' head state from the sensor of the virtual reality device, e.g., the angle of the head, facing orientation, etc., can be implemented as the following. Specifically, the specific value of the rotation vector can be obtained from such a device as a linear acceleration sensor. The different angles presented when the virtual reality scene is rendered on the screen of the virtual reality device are determined according to these data. In this case, users can feel like being in a virtual scene. It greatly enriches the users' experience and allows the user to have an excellent immersive feeling.

Figure 2:
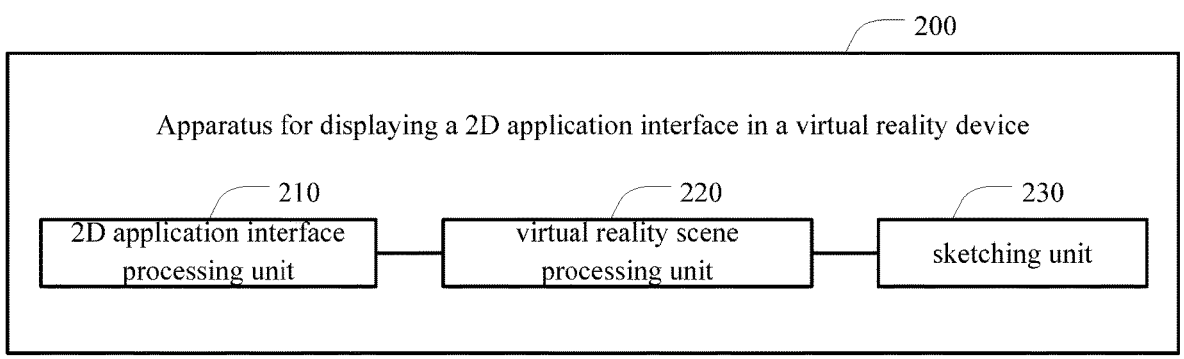
FIG. 2 is the structural diagram of an apparatus for displaying the 2D application interface in the virtual reality device according to one embodiment of the disclosure.

FIG. 2 shows a structural diagram of an apparatus for displaying a 2D application interface in a virtual reality device according to one embodiment of the disclosure. As it shown in FIG. 2, the apparatus 200 for displaying the 2D application interface in the virtual reality device includes:

a 2D application interface processing unit 210 configured to obtain a texture of one or more 2D application interfaces to be displayed;

a virtual reality scene processing unit 220 configured to determine a virtual reality scene to be displayed and write the virtual reality scene into a frame buffer of an Android system in a left-right screen splitting mode using an OpenGL function;

a sketching unit 230 configured to sketch contents in the frame buffer of the Android system onto left and right screens of the virtual reality device respectively to form a virtual screen in the virtual reality scene, and sketch the obtained texture of the one or more 2D application interfaces to be displayed onto the virtual screen in the virtual reality scene of the left and right screens, respectively.

It can be seen that to address the existing problem of not being able to render a 2D application interface on a virtual reality device in the virtual reality system, the apparatus shown in FIG. 2 takes the following techniques: first, the 2D application interface processing unit 210 obtains the texture of one or more 2D application interfaces to be displayed; the virtual reality scene processing unit 220 further determines the virtual reality scene to be displayed and writes the virtual reality scene to be displayed into the frame buffer of the Android system in the left-right screen splitting mode using the OpenGL function; the sketching unit 230 complete the display of the virtual reality scene on the left and right screens of the virtual reality device using the Android system's technology of reading the contents in the frame buffer for sketching, to form a virtual screen in the virtual reality scene; finally, the texture of the one or more 2D application interfaces to be displayed is sketched onto the virtual screen in the virtual reality scene of the left and right screens respectively so as to render the 2D application interfaces as the images in the left and right eyes simultaneously, with a three-dimensional sense. This method allows a large number of existing Android applications to be used in a virtual reality system, and thus is at low cost, simple and has improved the ecological environment of the virtual reality system and fits to practical use.

In one embodiment of this disclosure, in the apparatus shown in FIG. 2, the 2D application interface processing unit 210 includes:

a layer applying module 211 configured to apply for corresponding layers for the one or more 2D application interfaces to be displayed respectively;

a synthesis module 212 configured to call a SurfaceFlinger module in the Android system that is responsible for display synthesis, to label the synthesis mode as a GLES synthesis mode in the setUpHWComposer( ) function of the SurfaceFlinger module and to synthesize the layers using the GLES synthesis mode.

In one embodiment of this disclosure, in the above-described apparatus, the synthesis module 212 is specifically configured to determine the display relations of the layers. The synthesis module 212 creates a texture object bound to GL_TEXTURE_2D and a frame buffer object bound to GL_FRAMBUFFER using the OpenGL function, and correlates the frame buffer object with the texture object. According to the display relations of the layers, the synthesis module 212 sketches the 2D application interfaces to be displayed in each of the layers into the texture object.

In one embodiment of the disclosure, in the above-described apparatus, the sketching unit 230 is specifically configured to obtain the texture of one or more 2D application interfaces to be displayed from the frame buffer object associated with the texture object and use the OpenGL function to sketch the texture onto the virtual screen in the virtual reality scene of the left and right screens respectively.

In one embodiment of the disclosure, in the above-described apparatus, the virtual reality scene processing unit 220 is specifically configured to obtain the data of a user's head state through a sensor of the virtual reality device and determine the virtual reality scene to be displayed according to the data of the user's head state.

It should be noted that the specific implementation of the above-mentioned embodiments of the apparatus of FIG. 2 is the same as the implementation of the previously described corresponding embodiments of the method respectively. Therefore they will not be described again here.

In summary, in view of the existing problem of not being able to render the 2D application interface on a virtual reality device in the virtual reality system, the present disclosure takes the following techniques: first, the texture of the one or more 2D application interfaces to be displayed is obtained; then the virtual reality scene to be displayed is determined; the virtual reality scene is written into the frame buffer of the Android system in the left-right screen splitting mode using the OpenGL function; the virtual reality scene being displayed on the left and right screens of the virtual reality device is realized based on the technology of the Android system about reading the contents in the frame buffer for sketching, thus forming the virtual screen in the virtual reality scene; finally, the texture of one or more 2D application interfaces to be displayed is sketched onto the virtual screen in the virtual reality scene of the left and right screens respectively so as to render the 2D application interfaces as the images in left and right eyes simultaneously, with a three-dimensional sense. This method allows a large number of existing Android applications to be used in a virtual reality system, and therefore is at low cost, simple and has improved the ecological environment of the virtual reality system and fits to practical use.

The above description is only preferred embodiments of the disclosure, not intended to limit the protecting scope of this disclosure. Any modification, equivalent replacement, improvement etc. within the spirit and principles of this disclosure are included within the protecting scope of this disclosure.

The invention claimed is:

1. A method of displaying a 2D application interface in a virtual reality device, the method comprising:
   obtaining a texture of one or more 2D application interfaces to be displayed;
   determining a virtual reality scene to be displayed;
   establishing a grid for left and right screens of the virtual reality device;
   after establishing the grid, writing the virtual reality scene into a frame buffer of an Android system in a left-right screen splitting mode using an OpenGL function;
   sketching contents in the frame buffer of the Android system onto the grid of left and right screens of the virtual reality device to form a virtual screen in the virtual reality scene; and
   after that the virtual screen is formed by sketching the contents onto the grid, sketching the obtained texture of the one or more 2D application interfaces onto the virtual screen in the virtual reality scene of the left and right screens.

2. The method of claim 1, wherein obtaining the texture of the one or more 2D application interfaces to be displayed comprises:
   applying for corresponding layers for the one or more 2D application interfaces to be displayed calling a SurfaceFlinger module in the Android system that is responsible for display and synthesis, labelling the synthesis mode as a GLES synthesis mode in the setUp HWComposer( ) function of the SurfaceFlinger module, and
   synthesizing the layers using the GLES synthesis mode.

3. The method of claim 2, wherein synthesizing the layers using the GLES synthesis mode comprises:
   determining display relations of the layers;
   creating a texture object bound to GL_TEXTURE_2D and a frame buffer object bound to GL_FRAMEBUFFER using the OpenGL function;
   correlating the frame buffer object with the texture object; and
   according to the display relations of the layers, sketching the 2D application interfaces to be displayed in each of the layers into the texture object.

4. The method of claim 3, wherein sketching the obtained texture of the one or more 2D application interfaces to be displayed onto the virtual screen in the virtual reality scene of the left and right screens comprises:
   obtaining the texture of the one or more 2D application interfaces to be displayed from the frame buffer object correlated to the texture object; and
   sketching the texture onto the virtual screen in the virtual reality scene of the left and right screens respectively using the OpenGL function.

5. The method of claim 4, wherein determining the virtual reality scene to be displayed comprises:
   obtaining data of a user's head state by a sensor of the virtual reality device; and
   determining the virtual reality scene to be displayed based on the data of the user's head state.

6. A virtual reality device comprising a processor configured to:
   obtain a texture of one or more 2D application interfaces to be displayed;
   determine a virtual reality scene to be displayed;
   establishing a grid for left and right screens of the virtual reality device;
   after establishing the grid, write the virtual reality scene into a frame buffer of an Android system in a left-right screen splitting mode using an OpenGL function;
   sketch contents in the frame buffer of the Android system onto the grid of the left and right screens of the virtual reality device to form a virtual screen in the virtual reality scene; and
   after that the virtual screen is formed by sketching the contents onto the grid, sketch the obtained texture of the one or more 2D application interfaces to be displayed onto the virtual screen in the virtual reality scene of the left and right screens.

7. The virtual reality device of claim 6, wherein the processor is further configured to:
   apply for corresponding layers for the one or more 2D application interfaces to be displayed;
   call a SurfaceFlinger module in the Android system that is responsible for display and synthesis, to label the synthesis mode as a GLES synthesis mode in the setUp HWComposer ( ) function of the SurfaceFlinger module; and
   synthesize the layers using the GLES synthesis mode.

8. The virtual reality device of claim 7, wherein the processor is further configured to:
   determine display relations of the layers to create a texture object bound to GL_TEXTURE_2D and a frame buffer object bound to GL_FRAMEBUFFER using the OpenGL function, correlate the frame buffer object with the texture object; and
   sketch the 2D application interfaces to be displayed in each of the layers into the texture object according to the display relations of the layers.

9. The virtual reality device of claim 8, wherein the processor is further configured to:
   obtain the texture of the one or more 2D application interfaces to be displayed from the frame buffer object correlated to the texture object; and
   sketch the texture onto the virtual screen in the virtual reality scene of the left and right screens respectively using the OpenGL function.

10. The virtual reality device of claim 9, wherein the processor is further configured to:
    obtain data of a user's head state by a sensor of the virtual reality device; and
    determine the virtual reality scene to be displayed based on the data of the user's head state.

* * * * *